United States Patent
Chiu et al.

(10) Patent No.: US 6,695,607 B2
(45) Date of Patent: Feb. 24, 2004

(54) MOLD HALF-BLOCK FOR INJECTION MOLDING AN OPTICAL ARTICLE OUT OF THERMOPLASTIC MATERIAL, AND A MOLD INCLUDING SUCH A HALF-BLOCK

(75) Inventors: Hao-Wen Chiu, Clearwater, FL (US); Hsinjin Yang, Palm Harbor, FL (US)

(73) Assignee: Essilor International (Compagnie Generale d'Optique), Paris (FR)

( * ) Notice: Subject to any disclaimer, the term of this patent is extended or adjusted under 35 U.S.C. 154(b) by 0 days.

(21) Appl. No.: 10/015,586

(22) Filed: Dec. 17, 2001

(65) Prior Publication Data

US 2003/0113398 A1 Jun. 19, 2003

(51) Int. Cl.$^7$ ............................................. B29C 45/73
(52) U.S. Cl. .................. 425/190; 425/548; 425/552; 425/808
(58) Field of Search ................. 425/190, 547, 425/548, 552, 808

(56) References Cited

U.S. PATENT DOCUMENTS 4,364,878 A * 12/1982 Laliberte et al. ............. 264/2.2
5,376,317 A    12/1994 Maus et al.
5,458,820 A    10/1995 Lefebve
6,156,242 A * 12/2000 Saito et al. .................. 264/2.2

FOREIGN PATENT DOCUMENTS

FR    2 525 525    10/1983
WO    99/24243    5/1999

* cited by examiner

Primary Examiner—James P. Mackey
Assistant Examiner—Donald Heckenberg
(74) Attorney, Agent, or Firm—Young & Thompson

(57) ABSTRACT

A mold half-block possesses at least one mold recess defined transversely by the working face of a shell provided with heat-transfer parts that are intrinsic and both-way (both heating and cooling), the shell including a base that receives all of the heat-transfer parts and a removable insert fitted on the base and carrying the working face, the insert having no intrinsic heat-transfer parts and being thermally regulated solely by heat transfer with the base. The insert is in the form of a cap which fits over at least a head portion of the base, and the heat-transfer parts of the base are allocated to the head portion of the base having the insert fitted thereover.

11 Claims, 2 Drawing Sheets

MOLD HALF-BLOCK FOR INJECTION MOLDING AN OPTICAL ARTICLE OUT OF THERMOPLASTIC MATERIAL, AND A MOLD INCLUDING SUCH A HALF-BLOCK

The present invention relates to manufacturing optical articles out of thermoplastic synthetic material, such as ophthalmic lenses, instrument lenses or precision optics, as obtained by injection molding.

BACKGROUND OF THE INVENTION

The molding of ophthalmic lenses out of thermoplastic synthetic material is usually performed by injection molding, with this method enabling raw plastics material to be transformed directly into finished lenses (excluding coatings). In the manufacture of lenses by a method of this kind, it is conventional for the thermoplastic material to be initially heated so as to be molten at a temperature above the vitreous transition point. While in this form, the material is introduced under high pressure into a mold cavity of appropriate dimensions and shape that is formed in a mold. The material is then allowed to cool down so as to solidify, after which the resulting lens is extracted from the mold. Usually, the material used is a thermoplastic resin such as polymethyl methacrylate, polycarbonate, or a copolymer of polycarbonate, polynorbornene, polystyrene, cyclic polyolefins and their copolymers, etc.

To obtain ophthalmic lenses possessing optical qualities suitable for their purpose, certain precautions need to be taken during manufacture, in particular to avoid irregular deformations or the presence of residual internal tensions. Such deformations or tensions give rise to anisotropy or to other undesirable optical aberrations such as double refraction.

In this respect, special care is taken when making the wall of the mold cavity in the mold. Usually, the mold comprises two half-blocks each of which has at least one mold recess formed therein for association with a corresponding recess formed in register in the other block. The two half-blocks can move relative to each other between an open configuration giving direct access to the recesses and a closed configuration in which the two half-blocks come into contact with each other via junction faces lying in a transverse join plane and in which the recesses co-operate in pairs to form the desired mold cavity(ies).

Each mold recess is defined transversely by an interchangeable mold shell which presents a molding working face possessing appropriate dimensions and curvature corresponding to those that are to be imparted to the finished lens (with allowance being made for a certain amount of shrinkage). By way of example, such shells are made of stainless steel, a nickel-based alloy, or mineral glass, and they present optical polish, i.e. polish analogous to that of a mirror.

In addition, it is often recommended to proceed with injection of the material into the recess in two successive stages: a first stage of filling proper during which the recess is filled progressively, and a second stage of overpacking or compression which takes place after the recess has been filled completely. This second stage of overpacking or compression consists in subjecting the material introduced in this way into the recess to high pressure for a given length of time in order to eliminate shrink marks, to ensure that the material has the proper density, and to reduce harmful internal tensions, at least to some extent. When this holding pressure is generated by the injection machine itself, the material is said to be being overpacked. When it is the result of moving the mold shells towards each other, then the material is said to be being compressed.

In any event, these precautions relating to tooling and mode of operation need to be associated with precautions relating to how the plastics material and the mold are heated during molding. It turns out to be essential to have accurate control over the temperature of the mold cavity and its wall, in particular the temperature of the working face of the shell, for this to apply throughout all of the molding steps, and for this to be done using a temperature gradient that is defined both in time and in space. For this purpose, the half-blocks of the mold are usually provided with heat transfer means, and preferably with means that are both-way means (i.e. suitable for exerting both heating functions and cooling functions), in order to regulate the temperature of the mold around the mold cavity from one cycle to the next, and in order to accelerate the removal of heat from the molded lens. By way of example, these means can be channels for circulating a heat-conveying fluid. The heat delivered or extracted by circulating the hot fluid or by electrical resistances spreads through the mass of the half-blocks and, by thermal conductivity, through the mass of the shells, and is communicated via the working faces thereof into the mold cavity and thus into the plastics material while it is being shaped.

This method of heating/cooling nevertheless presents drawbacks in practice, in particular because of the considerable thermal inertia of the half-blocks. Lack of precision is observed both concerning temperature distribution within the mold, around the mold cavity, and concerning how temperature varies over time. Initially, this technique does not ensure that the plastics material is heated in regular and uniform manner as would be desirable to avoid internal tension. Different portions of the mold, and more particularly of the wall of the mold cavity, reach the temperature required for each of the various molding stages only progressively and unevenly. This lack of uniformity in heat transmission also arises during cooling after injection. Furthermore, and above all, the way in which the temperature of the mold cavity varies during the different stages of molding is not controlled in a manner that is sufficiently precise, and this runs the risk of giving rise to the above-mentioned major optical defects or else requires cycle times to be lengthened to an unacceptable extent. Because of this unequal heating and cooling at various points of the cast material, and because of the lack of precision in the temperature gradient over time, the resulting lens can conserve deformations and tensions which can make it unsuitable for the intended optical uses.

To improve the precision with which temperature gradient is controlled, molds have been designed in which the shells themselves are provided with intrinsic both-way means for transferring heat, such as channels for circulating a heat-conveying fluid. Integrating both-way heat transfer means in the main portions of the mold as constituted by the shells makes it possible both to heat and to cool the major portion of the wall of the mold cavity in application of an optimized temperature regulation relationship without it being necessary to move the mold in order to subject it to the action of external heating and/or cooling means. Nevertheless, with usual dispositions of that type, the shells provided for receiving the heating and cooling means are fixed to the half-blocks concerned and it is as a function of this arrangement that the couplings to heating fluid or electricity are organized. In installations of that kind, the operations of installing and removing shells are lengthy and complicated.

In order to avoid such complications while retaining the advantages that result from the heat transfer means acting directly on the shells, proposals were made to implement a shell in two portions:

a base receiving all of the heat transfer means for said shell; and a removable insert fitted to the base and carrying the molding face, said insert having no intrinsic heat transfer means and being temperature-regulated solely by heat transfer with said base.

The insert is thus interchangeable, and as a result, it can be selected from a preestablished set, or can even be made on demand, as a function of how the desired surface for the lens is defined. The insert is thus easy and quick to install and/or remove since it has no hydraulic or electrical couplings, either with the temperature-regulation source or with the base. Couplings to the temperature-regulation source take place via the base and therefore do not need to be disassembled.

Although that configuration is advantageous in that it combines, at least in theory, the advantage of direct temperature action on the shell with the convenience of having an insert that is interchangeable, it nevertheless turns out to be capable of being improved in terms of the efficiency and the precision of the temperature regulation it makes possible.

OBJECTS AND SUMMARY OF THE INVENTION

The invention provides a mold half-block for injection molding an optical article such as an ophthalmic lens out of thermoplastic material, the half-block possessing at least one mold recess defined transversely by the working face of a shell provided with heat-transfer means that are intrinsic and both-way (both heating and cooling), said shell including a base receiving all of the heat-transfer means of said shell and a removable insert fitted on the base and carrying the working face, said insert having no intrinsic heat-transfer means and being thermally regulated solely by heat transfer with said base. The insert is cap-shaped and fits over a head portion of at least the base, and the heat-transfer means of the base are allocated to the head portion of the base that is covered by the insert.

Such an arrangement makes it possible to improve the efficiency and the precision with which heat is exchanged between the heat-transfer means and the insert via the base. It will be understood that firstly the cap shape of the insert and the engagement of the head portion of the base in said insert of itself increases the heat exchange area between the insert and the base. In addition, and above all, in this context the location of the heat-transfer means within the head of the base amounts, from the point of view of heat-transfer efficiency, to placing said heat-transfer means so to speak "inside" the insert, with the head portion of the base, the only portion concerned by heat transfer, being "enveloped" inside the cap-forming insert.

According to an advantageous characteristic of the invention, the shell is received in a jacket having a cylindrical inside face defining the sides of the recess in addition to the working face of the shell, and is likewise provided with heat-transfer means that are intrinsic and both-way. Enveloping the shells in a jacket that is thermally self-modulated makes it possible to improve the quality and in particular the precision with which the temperature gradient of the mold is regulated around the mold cavity, and as a result in the thermoplastic material also. The jacket thus provides a thermal blanket effect which is additional to its optional function of providing the two shells with mechanical guidance relative to each other when it is desired to perform compression at the end of injection.

It is then advantageous for the intrinsic and both-way heat transfer means of the jacket to be independent from those of the shell.

In a preferred embodiment, the intrinsic and both-way heat-transfer means of the shell and of the jacket comprise respective internal circuits for circulating a heat-conveying fluid.

BRIEF DESCRIPTION OF THE DRAWINGS

Other characteristics and advantages of the invention will appear on reading the following description of a particular embodiment given by way of non-limiting example.

Reference is made to the accompanying drawings, in which.

MORE DETAILED DESCRIPTION

With reference to the figures, a mold of the invention for injection molding an optical article out of thermoplastic material, and in particular an ophthalmic lens, comprises two half-blocks 1, 2 each possessing at least one respective mold recess 3, 4 of cylindrical outline about an axis A.

Figure 1:
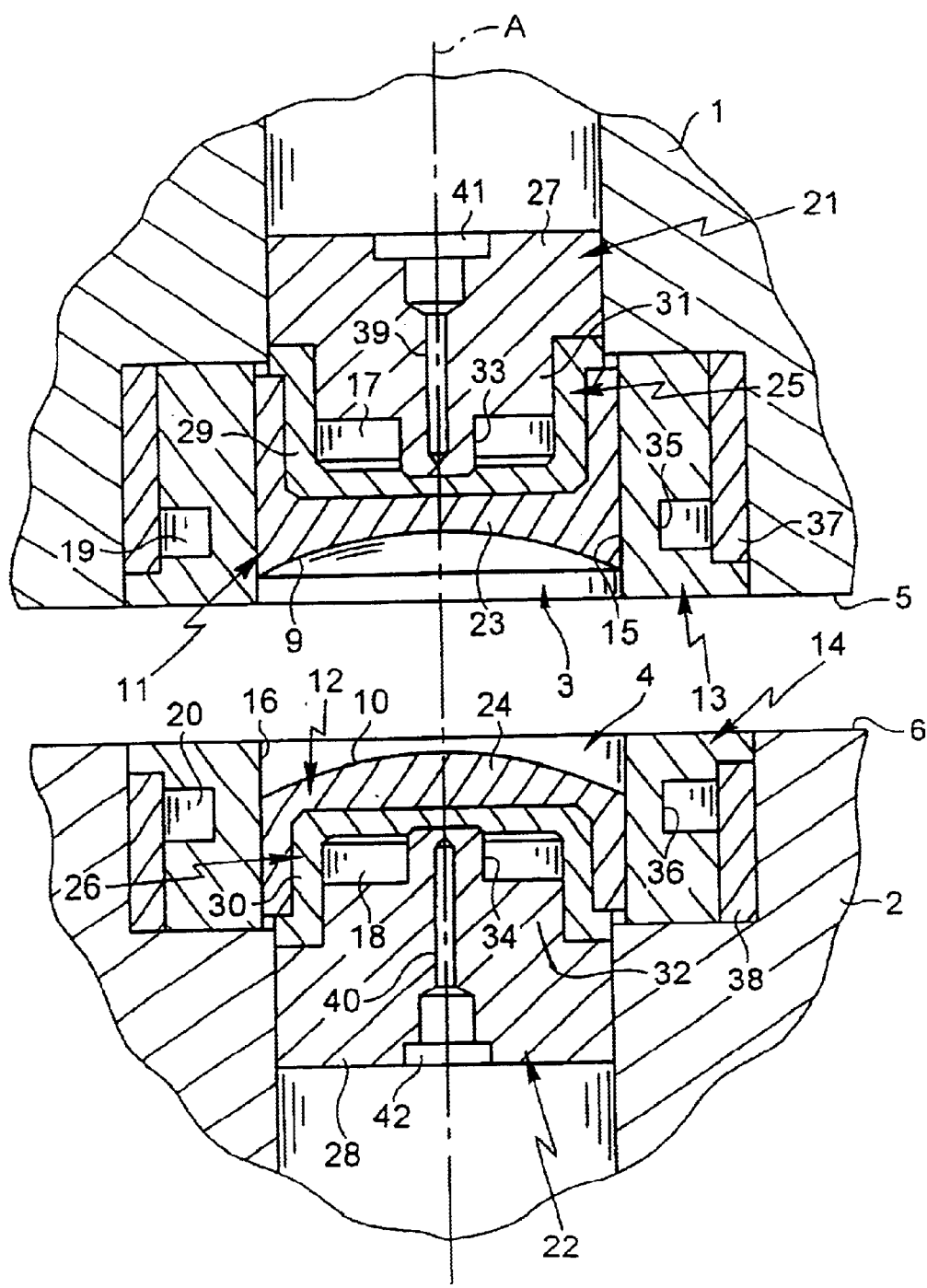
FIGS. 1 and 2 are fragmentary views of the zone containing the mold cavity in a mold of the invention, the views being in section on a plane containing the axis of the mold cavity and being shown respectively in an open configuration and in a closed configuration.
Figure 2:
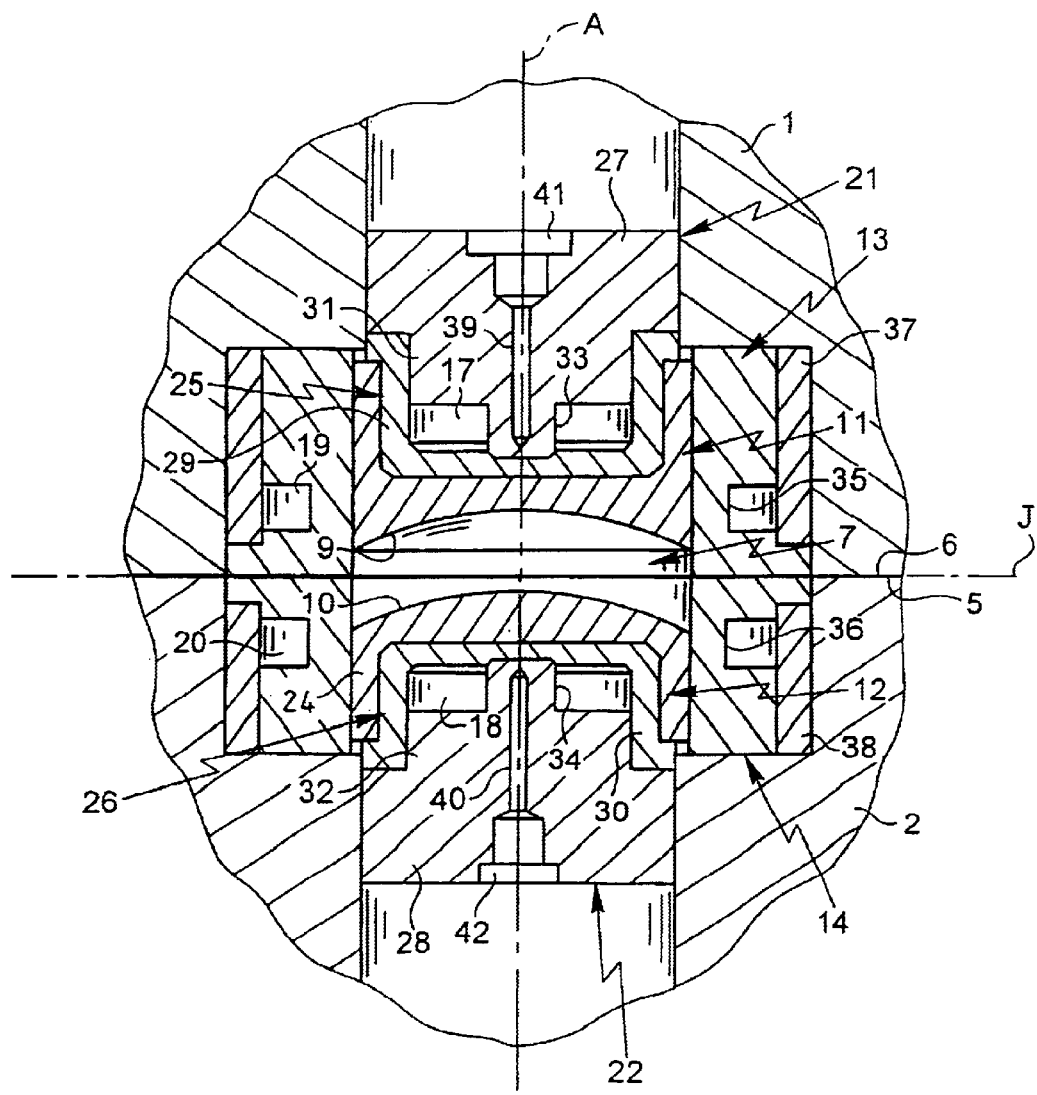

The two half-blocks 1, 2 can move relative to each other, for example in translation along the axis A, between an open configuration giving direct access to the recesses 3, 4 and a closed configuration in which the two half-blocks 1, 2 make contact via junction faces 5, 6 in a transversal join plane referenced J in FIG. 2 and in which the recesses 3, 4 co-operate in order to form the desired mold cavity 7.

In practice, each half-block 1, 2 preferably has a plurality of mold recesses such as 3, 4 and, in the closed configuration, these recesses co-operate in pairs to form a plurality of mold cavities such as 7, thus making it possible for a single mold to make a plurality of lenses simultaneously.

Each recess 3, 4 is defined transversely by the working face 9, 10 of a shell 11, 12. In the example shown in the figures, the working face 9 of the upper shell 11 is concave while the working face 10 of the lower shell 12 is convex.

Each shell 11, 12 is received in a tubular jacket 13, 14 on the axis A and presents a cylindrical inside face 15, 16 about the axis A serving to define the sides of the recess 3, 4, in addition to the working faces 9, 10 of the shells 11, 12. The faces 9, 10, 15, and 16 thus form the wall of the recesses 3, 4 and thus of the mold cavity 7.

Each shell 11, 12 and the associated jacket 13, 14 is provided with its own heat-transfer means that are intrinsic and both-way. The term "both-way" is used to mean suitable both for heating and for cooling the shell 11, 12 and its jacket 13, 14. The term "intrinsic" is used to indicate that the means are not of external origin but act directly, by construction, on each shell 11, 12 and each jacket 13, 14.

More precisely, in this case, the intrinsic and both-way heat-transfer means of a shell 11, 12 or of a jacket 13, 14 is implemented in the form of an internal circuit for circulating a heat-conveying fluid. Thus, each shell 11, 12 has a respective circuit 17, 18 and each jacket 13, 14 has a respective circuit 19, 20. Naturally, this form of implementation is not exclusive; for example it is possible to provide resistance elements, internal circuits for circulating a gas, convection means, etc.

In addition, whatever the way in which they are implemented, the intrinsic and both-way heat-transfer means of the jackets 13 and 14, i.e. specifically the circuits 19 and 20, are advantageously independent of the means 17, 18 belonging to the shells 11, 12. This independence makes it possible to achieve finer regulation of temperature gradient, not only in time but also in space around the mold cavity 7, and also finer regulation of the temperature of the mold cavity wall constituted by the working faces 9, 10 of the shells 11, 12 and the inside faces 15, 16 of the jackets 13, 14 when the mold is in the closed configuration.

Each shell 11, 12 comprises two portions:

a base 21, 22; and a removable insert 23, 24 fitted on the base 21, 22 and carrying the working face 9, 10.

The base 21, 22 receives the heat-transfer means of the corresponding shell 11, 12 in full, i.e. it receives the entire circuit 17, 18. The insert 23, 24 therefore has no intrinsic heat-transfer means and is temperature-regulated solely by heat transfer with the base 21, 22.

Each insert 23, 24 is in the form of a cap, and because of its shape it covers a head portion 25, 26 of the base 21, 22, with the exception of the foot portion of said base.

The heat-transfer means of the base constituted by the circuit 17, 18 is allocated to the head portion 25, 26 of the base that is covered by the cap-shaped insert 23, 24.

In the example shown, the base 21, 22 has two portions: a plinth 27, 28 and a lid or tip 29, 30 covering a smaller-diameter head portion 31, 32 of the plinth 27, 28. This head portion 31, 32 presents a step 33, 34 at its end which co-operates with the lid 29, 30 to define the circuit 17, 18 for circulating the heat-conveying fluid, which is in the form of an annulus around the axis A.

A feed channel 39, 40 is formed in the plinth 27, 28 on the axis A. This channel opens out into the annular circuit 17, 18 and possesses an inlet 41, 42 suitable for receiving a coupling (not shown) fitted to the end of a feed duct (not shown) for delivering hot or cold fluid. Similarly, a return channel (not shown) is provided in the plinth 27, 28 to enable fluid to be removed after heat exchange.

The jacket 13, 14 possesses an annular groove 35, 36 formed in a setback of a cylindrical outside face about the axis A of the jacket 13, 14. This groove is closed by a tubular web 37, 38 fitted onto the outside face of the jacket 13, 14 to form the circuit 19, 20 for circulating the heat-conveying fluid, which circuit is annular in shape about the axis A.

What is claimed is:

1. A mold half-block for injection molding an optical article out of thermoplastic material, the half-block comprising:

at least one mold recess defined transversely by the working face of a shell provided with heat-transfer means that are intrinsic and both-way, said shell including a base receiving all of the heat-transfer means of said shell and a removable insert fitted on the base and carrying the working face, said insert having no intrinsic heat-transfer means and being thermally regulated solely by heat transfer with said base, wherein, the insert is cap-shaped and fits over a head portion of at least the base, and the heat-transfer means of the base are allocated to the head portion of the base that is covered by the insert.

2. A mold half-block according to claim 1, in which the shell is received in a jacket having a cylindrical inside face defining the sides of the recess in addition to the working face of the shell, and provided with heat-transfer means that are intrinsic and both-way.

3. A mold half-block according to claim 2, in which the intrinsic and both-way heat-transfer means of the jacket are independent of those of the shell.

4. A mold half-block according to claim 2, in which the intrinsic and both-way heat-transfer means of the shell and of the jacket comprise respective internal circuits for circulating a heat-conveying fluid.

5. A mold half-block according to claim 1, in which the base itself comprises two portions: a plinth and a lid covering the head portion of the plinth, said head portion presenting a step co-operating with the lid to define the circuit of said base for circulating the heat-conveying fluid.

6. A mold half-block according to claim 4, in which the jacket possesses an annular groove closed by a tubular web to form the circuit of said jacket for circulating the heat-conveying fluid.

7. A mold for injection molding an optical article out of thermoplastic material, the mold comprising at least one half-block possessing at least one mold recess defined transversely by the working face of a shell provided with heat-transfer means that are intrinsic and both-way, said shell including a base receiving all of the heat-transfer means of said shell and a removable insert fitted on the base and carrying the working face, said insert having no intrinsic heat-transfer means and being thermally regulated solely by heat transfer with said base, the insert being cap-shaped and fitting over a head portion of at least the base, and the heat-transfer means of the base being allocated to the head portion of the base that is covered by the insert.

8. A mold for injection molding an optical article out of thermoplastic material, the mold comprising two half-blocks each possessing at least one mold recess defined transversely by the working face of a shell provided with heat-transfer means that are intrinsic and both-way, said shell including a base receiving all of the heat-transfer means of said shell and a removable insert fitted on the base and carrying the working face, said insert having no intrinsic heat-transfer means and being thermally regulated solely by heat transfer with said base, the insert being cap-shaped and fitting over a head portion of at least the base, and the heat-transfer means of the base being allocated to the head portion of the base that is covered by the insert, the blocks being movable relative to each other between an open configuration and a closed configuration in which the two half-blocks make contact via junction faces in a transverse join plane and in which the recesses co-operate in pairs to form the desired mold cavity(ies).

9. The mold half-block of claim 1, wherein, the base comprises a lower portion fitted into the head portion, the head portion is located intermediate the insert and the lower portion, and the heat-transfer means of the base are located intermediate the head portion and the lower portion.

10. The mold of claim 7, wherein, the base comprises a lower portion fitted into the head portion, the head portion is located intermediate the insert and the lower portion, and the heat-transfer means of the base are located intermediate the head portion and the lower portion.

11. The mold of claim 8, wherein, the base comprises a lower portion fitted into the head portion, the head portion is located intermediate the insert and the lower portion, and the heat-transfer means of the base are located intermediate the head portion and the lower portion.

* * * * *